May 1, 1928.
J. H. APPLETON
VALVE
Filed March 25, 1927
1,667,999
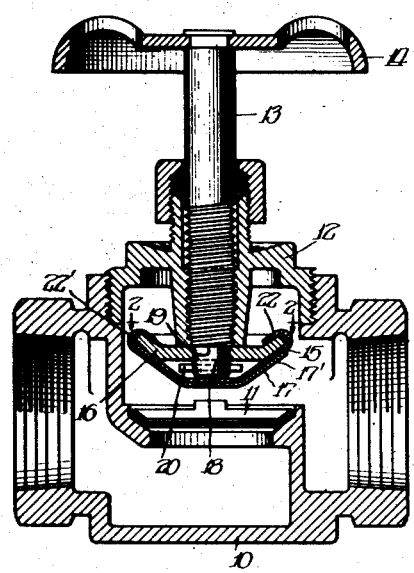
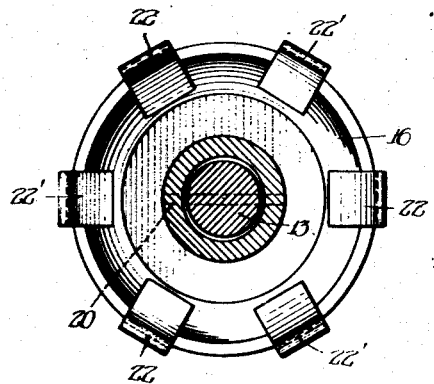
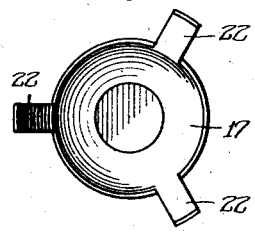
Witness:
R. Burkhardt
Inventor:
Joseph H Appleton,
By Cromwell Greist & Warden
Attys.

Patented May 1, 1928.

1,667,999

UNITED STATES PATENT OFFICE.

JOSEPH H. APPLETON, OF OSHKOSH, WISCONSIN, ASSIGNOR TO O'MALLEY-BEARE VALVE CORPORATION, OF CHICAGO, ILLINOIS, A CORPORATION OF DELAWARE.

VALVE.

Application filed March 25, 1927. Serial No. 178,174.

The present invention is concerned with valves of the type in which one or more replaceable head plates are employed.

The object of the invention is to provide, in such a valve, an improved head plate which is inexpensive to manufacture, is easy to apply or remove, may be used either singly or in multiple, and is absolutely fluid-tight in service.

While the foregoing statement is indicative in a general way of the nature of the invention, other objects and advantages will be evident to those skilled in the art upon a full understanding of the nature of the improvement.

In order that the invention may be readily understood, one form is presented herein for the purpose of exemplification, but it will of course be appreciated that the invention is susceptible of embodiment in other structurally modified forms coming equally within the scope of the appended claims.

In the accompanying drawing:

Fig. 1 is a vertical section through a valve equipped with the improvement;

Fig. 2 is a horizontal section, taken on the line 2—2 of Fig. 1;

Fig. 3 is a plan view of one of the head plates; and

Fig. 4 is a side view of one of the head plates.

The valve illustrated in the drawing is of the so-called globe type, and consists of a body 10, a seat 11, a bonnet 12, a stem 13, a handle 14, and a head 15. The invention resides in the head construction, which will be described in detail.

The head 15 includes a cup-shaped backing plate 16, and one or more readily replaceable cup-shaped head plates 17, 17'. The peripheral portions of the backing plate and head plates are preferably conical in shape, but may be flat, or of any shape desired.

The backing plate 16 is centrally apertured at 18, and fits over the lower end of the stem, where it is loosely held against an annular shoulder 19 on the stem by a cotter pin 20.

The head plates 17, 17' are not apertured at all, but are continuous from side to side, and are provided about their peripheries with a plurality of spaced attaching ears 22, 22'—preferably three in number—which are adapted to be bent upwardly and inwardly about the edge of the backing plate. The head plate 17 nearest the backing plate is first securely attached to the backing plate by the ears 22, and the next head plate 17' is then attached over the head plate 17 to the backing plate by the ears 22', the two nested head plates being so positioned in angular relation to each other as to cause the ears of one plate to occupy positions between the ears of the other.

The ears on the head plates may be easily bent into fastening position with an ordinary pair of pliers, and, when the lowermost head plate 17' becomes cut or otherwise unfit for further service, the ears 22' of that plate may be bent outwardly again and the plate removed, leaving the upper head plate 17 in position ready for service.

The head plates may be produced very economically from thin sheet metal by a simple stamping operation, and are absolutely fluid-tight in service, since they have no central apertures or other openings through which leakage may occur.

The seat against which the lower head plate bottoms may obviously be of any construction. The particular seat construction shown embodies an improvement which forms the subject matter of my co-pending application, Serial No. 178,175 filed March 25, 1927.

I claim:

1. In a valve, a stem, a centrally apertured sheet metal backing plate fitted over the lower end of the stem, means for preventing any substantial endwise movement of the backing plate on the stem while permitting the backing plate to rock slightly on the stem, and a head plate completely covering the pressure end of the stem and backing plate and having peripheral attaching ears which are adapted to be bent back over the edge of the backing plate.

2. In a valve, the combination with a stem, having a reduced lower end portion, of a centrally apertured sheet metal backing plate positioned on the reduced portion of the stem with the top of the backing plate against the shoulder on the stem resulting from the reduction, a pin extending through the stem beneath the backing plate for preventing any substantial endwise movement of the backing plate, and a sheet metal head plate completely covering the pressure end of the stem and backing plate and having peripheral attaching ears which are adapted to be bent back over the edge of the backing plate.

3. In a valve, the combination with a stem having a reduced lower end portion, of a centrally apertured backing plate positioned on the reduced portion of the stem with the top of the backing plate against the shoulder on the stem resulting from the reduction, means associated with the reduced portion of the stem beneath the backing plate for preventing any substantial endwise movement of the backing plate on the stem, and a sheet metal head plate completely covering the pressure end of the stem and backing plate and having peripheral attaching ears which are adapted to be bent back over the edge of the backing plate.

4. In a valve, a valve head, and two or more head plates which are shaped to nest one within the other and are provided with peripheral attaching ears; one of said plates being cupped over the head with its attaching ears bent back over the edge of the head, and the other being cupped over the first plate with its attaching ears bent back over the edge of the head between the ears on the first plate.

5. In a valve, a generally conical head, a plurality of generally conical head plates nested together over the head, and means on the plates for attaching each of the same separately to the head.

6. A head plate which is so shaped as to fit over or nest within a similar plate and is provided with attaching ears adapted to engage with the head of a valve between the attaching ears on a similar plate associated with such head.

In testimony whereof I have hereunto subscribed my name.

JOSEPH H. APPLETON.